Nov. 17, 1925. 1,561,935
J. E. KESSLER
VALVE GRINDER
Filed Oct. 4, 1922
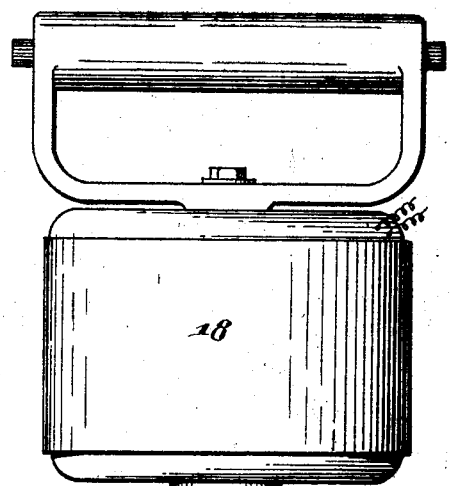
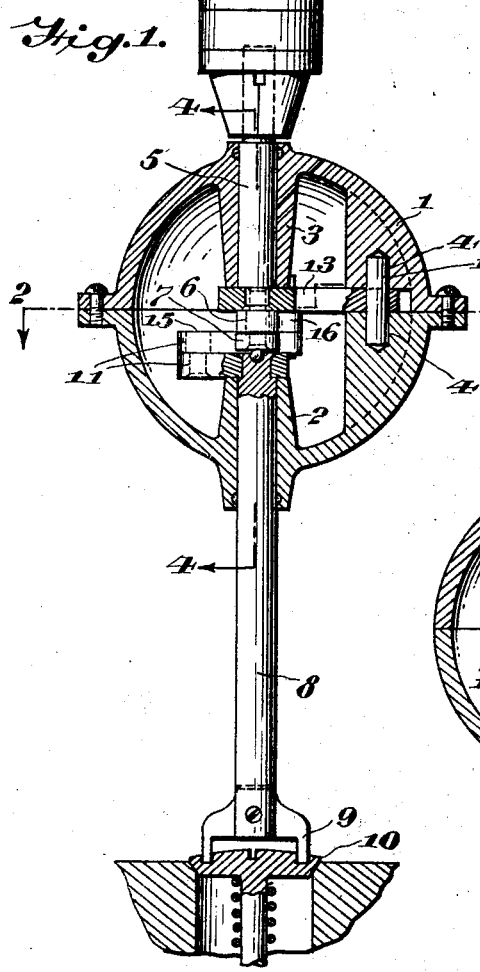
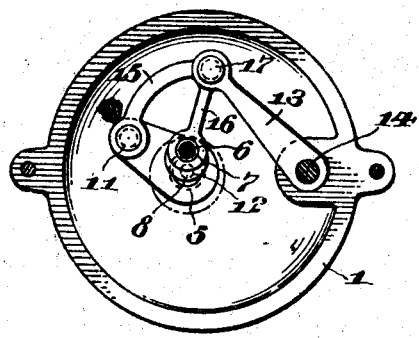
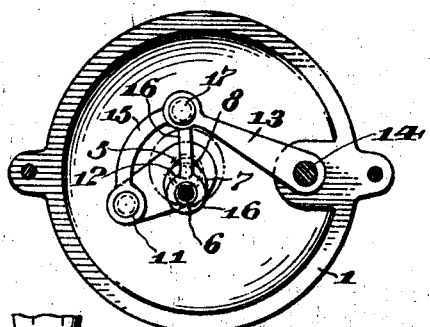
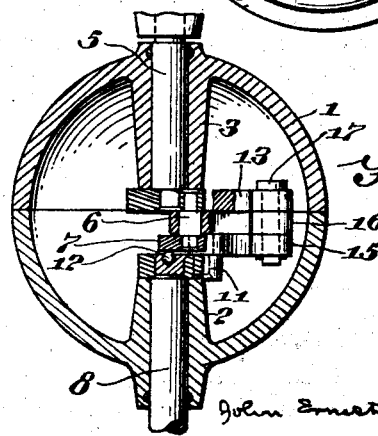
INVENTOR.
John Ernest Kessler.
BY
Augustus B. Stoughton
ATTORNEY.

Patented Nov. 17, 1925.

1,561,935

UNITED STATES PATENT OFFICE.

JOHN ERNEST KESSLER, OF PHILADELPHIA, PENNSYLVANIA.

VALVE GRINDER.

Application filed October 4, 1922. Serial No. 592,219.

*To all whom it may concern:*

Be it known that I, JOHN ERNEST KESSLER, a citizen of the United States, residing at Philadelphia, in the county of Philadelphia and State of Pennsylvania, have invented a new and useful Improvement in Valve Grinders, of which the following is a specification.

The principal object of the present invention is to provide a tool for use in grinding valves which shall be simple in construction and therefore inexpensive and which shall run comparatively cool and yet present the driving and driven spindles in axial alignment and in such a way that one spindle may be rotated continuously in one direction as by a portable electric drill, whilst the other oscillates back and forth. Another object of the invention is to provide an end thrust bearing between the confronting ends of the spindles and to avoid sliding contact between moving parts.

The invention will be claimed at the end hereof but will be first described in connection with the embodiment of it chosen for illustration in the accompanying drawings forming part hereof and in which Figure 1 is an elevational view, partly in section, of a grinder embodying features of the invention.

Fig. 2 is a sectional view taken on the line 2—2 of Fig. 1.

Fig. 3 is a view similar to Fig. 2 but showing the parts in their other extreme positions, and Fig. 4 is a view taken on the line 4—4 of Fig. 1.

In the drawings 1 is a housing shown as comprising two hollow hemispherical sections suitably secured together and provided with bearings 2 and 3 and seats 4. 5 is a driving spindle mounted for rotation through the wall of the housing and in the bearing 3. Within the housing this spindle 5 is provided with a crank pin 6 having a head 7 for a purpose to be presently described. 8 is a follower spindle adapted as at 9 to engage a valve 10, and this spindle 8 is aligned with the spindle 5 and is mounted for oscillation through the wall of the housing 1 and in the bearing 2. Within the housing this spindle 8 is provided with a crank pin 11. Between the head 7 and the end of the spindle 8 is arranged an end thrust bearing 12 shown as a ball. 13 is a rock-arm pivotally connected with the housing as by a pin 14 arranged in the seats 4. 15 and 16 are a pair of links pivotally connected with the rock-arm as at 17 and respectively with the crank pins 6 and 11.

In use a portable electric drill 18 may be employed to rotate the spindle 5 continuously in one direction. The crank pin 6 describes a circular path. The link 16 rocks the rock-arm 13 about its pivot 14 back and forth, so that the pivot 17 travels back and forth in a comparatively short arc. The link 15 swings the crank pin 11 back and forth in a short arc and thus the spindle 8 is oscillated appropriately for valve grinding whilst the spindle 5 makes complete revolutions in the same direction.

It will be evident from the foregoing description that in some of its aspects the invention is of wider application than to valve grinding and hence the described mechanism for converting rotary motion of one of two axially aligned shafts into oscillating motion of the other of the two axially aligned shafts forms in and of itself a part of my invention.

It will be obvious to those skilled in the art to which the invention relates that modifications may be made in details of construction and arrangement without departing from the spirit of the invention which is not limited as to those matters or otherwise than as the prior art and the appended claims may require.

I claim:

1. Valve grinder mechanism for converting rotary motion into oscillating motion which comprises the combination of a housing, a driving spindle mounted for rotation through a wall of the housing and provided within the housing with a crank pin having a head, a follower spindle axially aligned with the first mentioned spindle and mounted for oscillation through a wall of the housing and provided within the housing with a crank pin, an end thrust bearing between the confronting ends of the follower spindle and head, a rock-arm mounted in and pivotally connected with the housing, and a pair of links pivotally connected with the rock-arm and respectively with the crank pins.

2. Valve grinding mechanism for converting rotary motion into oscillation motion which comprises the combination of a driving spindle mounted for rotation, a crank pin fast on said spindle, a follower spindle axially aligned with the first mentioned spindle and mounted for oscillation and provided with a crank pin, a rock-arm, a pivot fixed in respect to the elements mentioned and about which the rock-arm swings, and a pair of links concentrically pivoted to the rock-arm and respectively pivotally connected with the crank pin.

3. Valve grinding mechanism for converting rotary motion into oscillating motion which comprises the combination of a driving spindle mounted for rotation, a crank pin fast on said spindle, a follower spindle axially aligned with the first mentioned spindle and mounted for oscillation and provided with a crank pin, a rock-arm, a pivot fixed in respect to the elements mentioned and about which the rock-arm swings, a pair of links pivotally and concentrically connected with the rock-arm and respectively with the crank pins, and an end thrust bearing between the confronting ends of the spindles.

JOHN ERNEST KESSLER.